United States Patent [19]

Weinert

[11] Patent Number: 4,613,928
[45] Date of Patent: Sep. 23, 1986

[54] TELEPHONE STERILIZER

[76] Inventor: Friedrich Weinert, 219-19-131st Ave., Jamaica, N.Y. 11413

[21] Appl. No.: 668,719

[22] Filed: Nov. 6, 1984

[51] Int. Cl.⁴ .............................................. H04M 1/22
[52] U.S. Cl. ..................................... 362/88; 179/185; 220/87; 422/186.3; 422/187
[58] Field of Search ........................... 179/185; 362/88; 422/186.3, 187; 220/87

[56]  References Cited
U.S. PATENT DOCUMENTS 4,486,628  12/1984  Thompson .......................... 179/185

Primary Examiner—Stephen J. Lechert, Jr.

[57] ABSTRACT

Telephone sterilizer consisting of a bacteria destroying light source. Light source installed under a protection shield mounted against instrument base of telephone in such a fashion that when hand set is put on cradle the mouthpiece of hand set matches the light source under protection shield which is activated for several seconds by a time relay which is synchronized with the mechanism of the cradle by means of a contact switch.

2 Claims, 5 Drawing Figures

TELEPHONE STERILIZER

This invention is a continuation of a previous invention entitled "Telephone and Microphone Sterilizer Type A."

SUMMARY OF THE INVENTION

Diseases are spread easily by public telephones which can introduce epidemics. The present invention would make it impossible to infect the telephone user. This is made possible by a bacteria killing light source which is installed under a shield mounted against the base of a telephone. The shield has an opening to align mouthpiece of hand set, therefore, the light source under the shield will emit light inside the cover consisting partly of outer surface of mouthpiece from hand-set to destroy bacteria. Additionally, the shield also protects the telephone user from the radiant light source.

The design is simple and installed vary easily without major changes. This is shown in FIGS. 1 and 3 demonstrating a telephone, meaning a bacteria killing light source is installed against the instrument base to sterilize the mouthpiece of a telephone hand set. The time of exposure is controlled by the movement of cradle which activates an electric switch when hand set rests on cradle, meaning when hand set is off cradle switch is on an open circuit. When hand set is resting off cradle, switch is on closed circuit. The light exposure should not last no longer than a few seconds, therfore a timer is connected to the positive lead of the light source. Therefore, timer will determine the exposure of light. In this design the light source can be replaced immediately without mechanical complications.

Further objects of this invention will be pointed out in the following detailed description and claims illustrated in the accompanying drawing which discloses by way of example the principal of this invention and the best mode which has been contemplated of applying that principal.

DETAILED DESCRIPTION OF A PREFERRED EMBODIMENT

Figure 3:
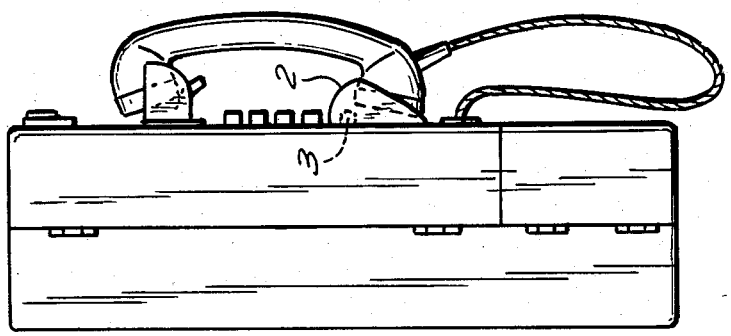
FIG. 3 is a plan side view of a telephone in neutral position to indicate bacteria destroying light source.
Figure 1:
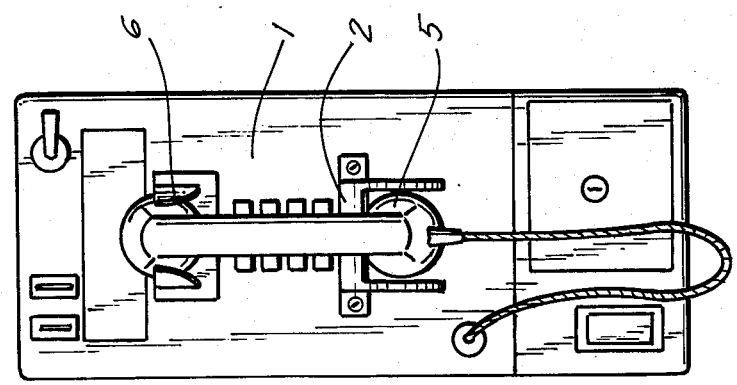
FIG. 1 is a front plan view of a telephone as used in public places.

Referring to FIG. 1 there is shown a telephone (1) with an adopted cover (2) which shields a bacteria destroying light source shown by dotted lines in FIG. 3. The light source is activated when hand-set is put on cradle, FIG. 1 (6).

Figure 2:
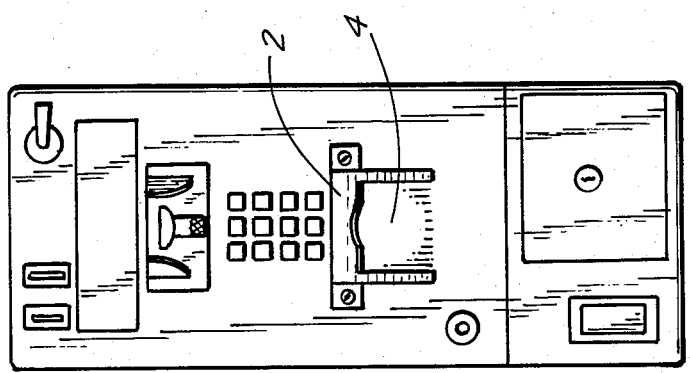
FIG. 2 is a front plan view of a telephone with a removed hand set.

FIG. 2 shows a telephone when hand set is removed from cradle which disconnects light source under a protection shield (2).

FIG. 3 shows a side view of a telephone with hand set in a neutral position to demonstrate how easy the light source can be replaced. Meaning when the light source (3) is in a form of a cylinder then it can be slid into a socket without complicated mechanical procedures. However, different combinations can be applied to it to protect the light source.

Figure 4:
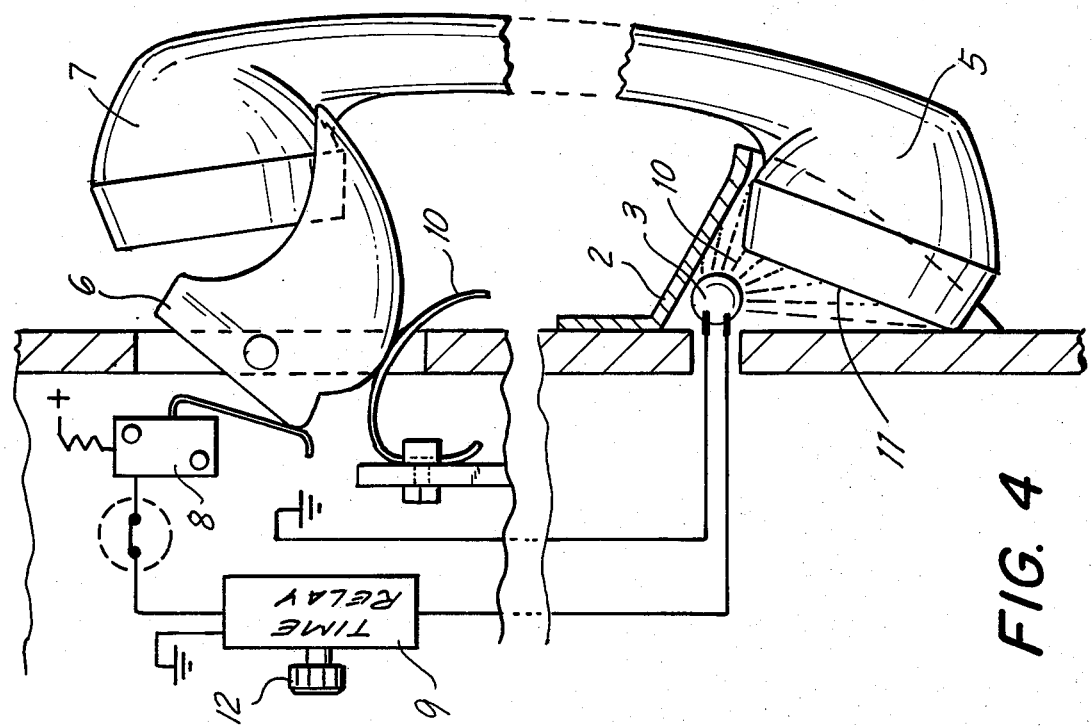
FIG. 4 is a detailed cross section view of cradle and hand set in neutral position.

FIG. 4 shows the mechanical procedure in combination with an electric diagram. Meaning cradle (6) carrying the load of hand-set (7) meaning the telephone is in neutral position. In this position the weight of hand-set (7) will lower cradle (6) which automatically activates micro switch (8) to supply electricity through a time relay (9) via light source (3). In this position spring (10) is put under tension by the weight of hand set (7&5). Naturally different mechanism can be applied to it. In this position light source (3) will radiate light (10) into mouthpiece (11) of hand set (5). After a few seconds, timer (9) will disconnect electricity to light source (3). Therefore, the light source is activated after the speaker is hooked up for a given time depending on the adjustment of timer which is regulated by knob (12).

Figure 5:
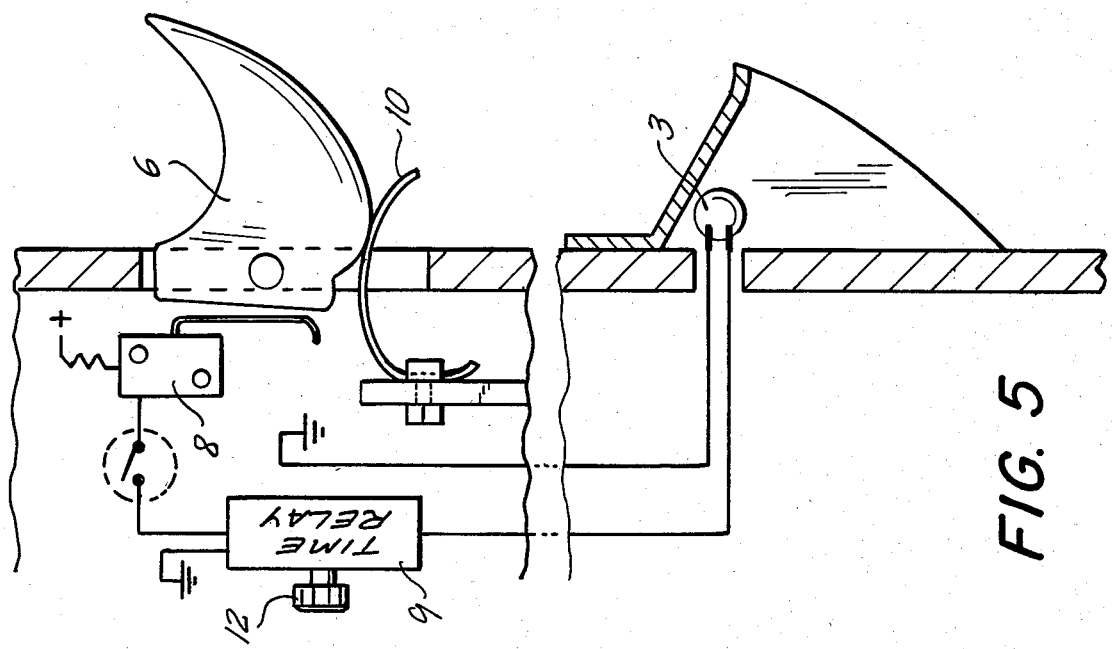
FIG. 5 is a detailed cross section view of cradle and hand-set in operation.

FIG. 5 shows a detailed cross section view of cradle mechanism during a conversation indicated by spring (10) which lifts cradle (6) into horizontal position. This will put microswitch (8) on an off position which cuts off the electricity to timer (9) via light source (3). This is the entire alteration needed to change any telephone from a health hazard into a genious apparatus combining audio equipment with hygiene to serve the public.

While there have been shown and described and pointed out the fundamental features of the invention as applied to a preferred embodiment, it will be understood that various ommissions and substitutions and changes in the form and detail of the device illustrated in its detail may be made by those skilled in the art without departing from the spirit of the invention.

I claim:

1. A telephone sterilizer consisting of a base or base housing of the telephone apparatus is support for the bacteria destroying light and the light is so positioned with respect to the base such that when the handset is placed in the cradle for said handset the light is adjacent to the mouthpiece of said handset and directs bacteria destroying light toward said mouthpiece.

2. A telephone sterilizer as claimed in claim 1 further includes a transparent mothpiece allowing radiant light to penetrate the mouthpiece to destroy bacteria on both sides of mouthpiece.

* * * * *